United States Patent
Dudha et al.

(10) Patent No.: US 10,387,600 B2
(45) Date of Patent: Aug. 20, 2019

(54) DYNAMIC POWER REDUCTION IN CIRCUIT DESIGNS AND CIRCUITS

(71) Applicant: Xilinx, Inc., San Jose, CA (US)

(72) Inventors: Chaithanya Dudha, San Jose, CA (US); Krishna Garlapati, Los Gatos, CA (US)

(73) Assignee: XILINX, INC., San Jose, CA (US)

(*) Notice: Subject to any disclaimer, the term of this patent is extended or adjusted under 35 U.S.C. 154(b) by 83 days.

(21) Appl. No.: 15/266,827

(22) Filed: Sep. 15, 2016

(65) Prior Publication Data

US 2018/0075172 A1 Mar. 15, 2018

(51) Int. Cl.
*G06F 17/50* (2006.01)
*G06F 1/32* (2019.01)

(52) U.S. Cl.
CPC ........... *G06F 17/505* (2013.01); *G06F 1/32* (2013.01); *G06F 17/5045* (2013.01); *G06F 17/5072* (2013.01); *G06F 17/5081* (2013.01); *G06F 2217/78* (2013.01); *G06F 2217/84* (2013.01)

(58) Field of Classification Search
CPC ........... G06F 17/5031; G06F 2217/84; G06F 17/505; G06F 17/5009; G06F 17/5077; G06F 2217/62; G06F 13/1689
USPC ........................................ 716/108, 134, 139
See application file for complete search history.

(56) References Cited

U.S. PATENT DOCUMENTS

| | | | |
|---|---|---|---|
| 7,098,689 B1 | 8/2006 | Tuan et al. | |
| 7,417,454 B1 | 8/2008 | Rahman et al. | |
| 7,603,646 B1 | 10/2009 | Jang et al. | |
| 8,037,443 B1* | 10/2011 | Krishnaswamy | G06F 17/505 716/108 |
| 8,058,905 B1 | 11/2011 | Klein et al. | |
| 8,104,012 B1 | 1/2012 | Klein et al. | |
| 8,201,127 B1 | 6/2012 | Wang et al. | |
| 8,648,500 B1 | 2/2014 | Jenkins et al. | |
| 8,743,653 B1 | 6/2014 | Narayanan et al. | |
| 2004/0060032 A1* | 3/2004 | McCubbrey | G06F 17/5054 716/104 |
| 2005/0132316 A1* | 6/2005 | Suaris | G06F 17/5031 716/108 |
| 2015/0040094 A1* | 2/2015 | Caldwell | G06F 17/5081 716/134 |
| 2015/0269295 A1* | 9/2015 | Selvidge | G06F 17/5031 716/108 |

* cited by examiner

*Primary Examiner* — Nghia M Doan
(74) *Attorney, Agent, or Firm* — Kevin T. Cuenot

(57) ABSTRACT

Reducing dynamic power consumption for a circuit can include analyzing, using a processor, a netlist specifying the circuit to determine a block of combinatorial circuitry in a first signal path with at least a threshold amount of switching activity and detecting, using the processor, a second signal path coupled to the block of combinatorial circuitry by a sequential circuit element. The second signal path has a delay that meets a target signal path requirement. Using the processor, the netlist can be modified by subdividing the block of combinatorial circuitry into at least a first portion and a second portion and moving one of the portions from the first signal path to the second signal path, wherein the moving separates the first portion from the second portion by the sequential circuit element.

20 Claims, 4 Drawing Sheets

DYNAMIC POWER REDUCTION IN CIRCUIT DESIGNS AND CIRCUITS

FIELD OF THE INVENTION

This disclosure relates to integrated circuits (ICs) and, more particularly, to dynamic power reduction in circuit designs and/or circuitry for implementation within ICs.

BACKGROUND

Dynamic power consumption of a circuit is a function of several different factors. These factors may include, but are not limited to, switching activity, operating frequency, and source voltage. For a variety of reasons, modern circuit designs have followed a trend of increasing dynamic power consumption. While this is largely true in general, it has been particularly true of circuits developed for communications applications.

Due, at least in part, to ever increasing performance requirements, modern circuits and circuit designs are often characterized by a number of features. These features include, but are not limited to, use of wide signal paths, higher clock frequencies, and so forth. As a result, a variety of circuit blocks tend to exhibit higher than average switching activity which negatively impacts dynamic power consumption.

In addition to meeting performance requirements, circuits and circuit designs must also meet power requirements often expressed or defined as a power budget. This means that increasing dynamic power consumption is a growing concern in view of recent trends.

SUMMARY

An embodiment includes a method of reducing dynamic power consumption for a circuit. The method can include analyzing, using a processor, a netlist specifying the circuit to determine a block of combinatorial circuitry in a first signal path with at least a threshold amount of switching activity and detecting, using the processor, a second signal path coupled to the block of combinatorial circuitry by a sequential circuit element. The second signal path has a delay that meets a target signal path requirement. The method can include, using the processor, modifying the netlist by subdividing the block of combinatorial circuitry into at least a first portion and a second portion and moving one of the portions from the first signal path to the second signal path, wherein the moving separates the first portion from the second portion by a sequential circuit element.

Another embodiment includes a system for reducing dynamic power consumption for a circuit. The system includes a processor programmed to initiate executable operations. The executable operations include analyzing a netlist specifying the circuit to determine a block of combinatorial circuitry in a first signal path with at least a threshold amount of switching activity and detecting a second signal path coupled to the block of combinatorial circuitry by a sequential circuit element. The second signal path has a delay that meets a target signal path requirement. The executable operations include modifying the netlist by subdividing the block of combinatorial circuitry into at least a first portion and a second portion and moving one of the portions from the first signal path to the second signal path, wherein the moving separates the first portion from the second portion by a sequential circuit element.

Another embodiment includes a computer program product. The computer program product includes a computer readable storage medium having program code stored thereon. The program code is executable by a processor to perform a method of reducing dynamic power consumption of a circuit. The method includes analyzing, using the processor, a netlist specifying the circuit to determine a block of combinatorial circuitry in a first signal path with at least a threshold amount of switching activity and detecting, using the processor, a second signal path coupled to the block of combinatorial circuitry by a sequential circuit element. The second signal path has a delay that meets a target signal path requirement. The method includes, using the processor, modifying the netlist by subdividing the block of combinatorial circuitry into at least a first portion and a second portion and moving one of the portions from the first signal path to the second signal path, wherein the moving separates the first portion from the second portion by a sequential circuit element.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
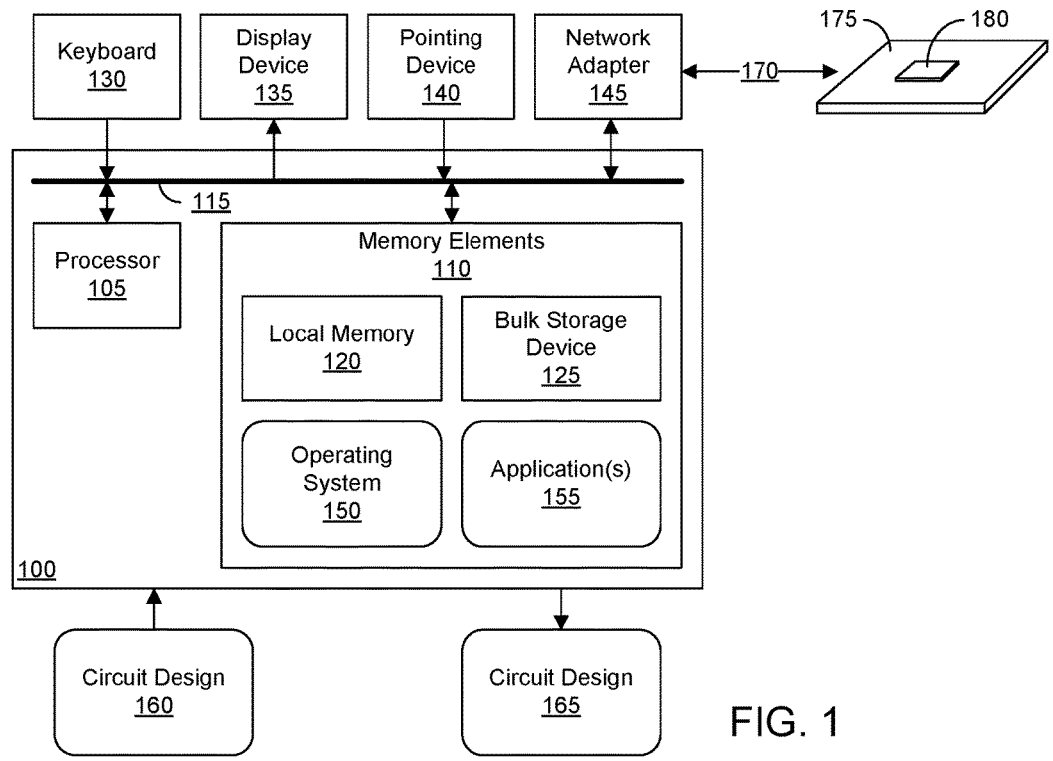
FIG. 1 is an example of a data processing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to dynamic power reduction in circuit designs and/or circuitry for implementation within ICs. Example embodiments described herein facilitate reduction of dynamic power consumption of circuits. A circuit design can be analyzed to determine one or more circuit blocks of combinatorial circuitry that exhibit at least a minimum amount, e.g., a threshold amount, of switching activity. Having a switching activity that exceeds the threshold amount of switching activity indicates that the circuit blocks likely consume a minimum amount of dynamic power. Such circuit blocks are considered candidates for further processing to reduce the dynamic power consumption of the circuit blocks.

A timing analysis of the circuit design may be performed to determine latency of the signal paths contained therein. Based, at least in part, upon the timing analysis, the candidate circuit block may be separated into a plurality of different portions. One or more portions of the candidate circuit block may be moved or relocated to a different signal path based upon whether the different signal paths meet one or more requirements. Subsequent to the relocation, the candidate circuit block is separated into two or more portions where the portions are separated from one another by at least one sequential circuit element. By separating the candidate circuit block into multiple portions separated by a sequential circuit element, the entirety of the candidate circuit block does not switch state during a same clock cycle. Rather, the switching activity that occurred during a single clock cycle for the candidate circuit block prior to the relocation of one or more portions now occurs over two or more clock cycles thereby reducing amount of dynamic power consumed by the circuit design on a given clock cycle.

The example embodiments described herein further support automatic, formal verification post synthesis. No special processing and/or other attributes are needed in order to perform formal verification. Such is the case as the example embodiments described herein utilize existing pipelined stages already included in the circuit design for processing. The operations described herein for reducing dynamic power consumption do not change the circuit design from a formal verification point of view, unlike other techniques for reducing dynamic power consumption.

FIG. 1 is an example of a data processing system (system) 100. System 100 is capable of being used to reduce the dynamic power consumption of a circuit design. As such, system 100 is capable of reducing the dynamic power consumption of circuitry implemented from the processed circuit design. For purposes of discussion, it should be appreciated that references made herein to reducing dynamic power consumption of a circuit design also apply to reducing dynamic power consumption of a circuit. The circuit design, including any changes introduced into the circuit design from implementation of one or more of the example embodiments described herein, may be implemented, or loaded, within a physical IC thereby reducing dynamic power consumption of the implemented circuitry and/or the IC.

As pictured, system 100 includes at least one processor 105 coupled to memory elements 110 through a system bus 115 or other suitable circuitry such as an input/output (I/O) subsystem. System 100 stores computer readable instructions (also referred to as "program code") within memory elements 110. Memory elements 110 may be considered an example of computer readable storage media. Processor 105 executes the program code accessed from memory elements 110 via system bus 115.

Memory elements 110 include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from bulk storage device 125 during execution.

System 100 may be coupled to one or more I/O devices such as a keyboard 130, a display device 135, a pointing device 140, and/or one or more network adapters 145. System 100 may include one or more additional I/O device(s) beyond the examples provided. The I/O devices described herein may be coupled to system 100 either directly or through intervening I/O controllers. In some cases, one or more of the I/O device(s) may be combined as in the case where a touch sensitive display device 135 (e.g., a touchscreen) is used. In that case, display device 135 may also implement keyboard 130 and/or pointing device 140.

Network adapter 145 is a communication circuit configured to establish wired and/or wireless communication links with other devices. The communication links may be established over a network or as peer-to-peer communication links. Accordingly, network adapter 145 enables system 100 to become coupled to other systems, computer systems, remote printers, and/or remote storage devices. Example network adapter(s) 145 may include, but are not limited to, modems, cable modems, Ethernet cards, bus adapters, connectors, ports, and so forth. Network adapter 145 may be a wireless transceiver, whether a short and/or a long range wireless transceiver.

As pictured, memory elements 110 may store an operating system 150 and one or more application(s) 155. Application 155, for example, may be an electronic design automation (EDA) application. In one aspect, operating system 150 and application(s) 155, being implemented in the form of executable program code, are executed by system 100 and, more particularly, by processor 105, to perform the various operations described within this disclosure. As such, operating system 150 and application 155 may be considered an integrated part of system 100. Operating system 150, application 155, and any data items used, generated, and/or operated upon by system 100 such as circuit designs, whether expressed as register transfer level descriptions, configuration bitstreams, netlists, hardware description language file(s), or in other formats, are functional data structures that impart functionality when employed as part of system 100 or when provided and/or loaded into a target IC for implementation of circuitry therein.

As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

System 100 may include fewer components than shown or additional components not illustrated in FIG. 1 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

As pictured in FIG. 1, system 100 is capable of receiving a circuit design 160. System 100 is capable of analyzing circuit design 160 to identify circuit blocks of combinatorial circuitry that have and/or exhibit at least a minimum amount of switching activity. Blocks of combinatorial circuitry that exhibit at least the minimum amount of switching activity are referred to as candidate blocks. System 100 is capable of modifying circuit design 160 by separating one or more of the candidate blocks into a plurality of different portions, e.g., at least a first portion and a second portion. System 100 is capable of moving one or more of the portions to one or more other signal paths that meet signal path requirement(s) described herein thereby generating and/or outputting circuit design 165.

A signal path that meets the signal path requirement(s) is referred to as a "target signal path." A target signal path is a path that is capable of receiving a portion of the combinatorial circuitry from a candidate block. In one aspect, the signal path requirement(s) may include delay (e.g., latency) requirements and connectivity requirements. Subsequent to the move, the first portion and the second portion are separated by one or more sequential circuit elements within circuit design 165.

System 100 is capable of performing the operations described herein on circuit design 160. System 100 is capable of outputting the modified circuit design post processing as circuit design 165. Circuit design 165 is functionally equivalent to circuit design 160. Circuit design 165, however, consumes less dynamic power than circuit design 160.

In another example embodiment, no circuitry other than sequential circuit elements separates the portions of the candidate block after the operation. Further, the order of the portions of the candidate block is maintained. As a result, no other combinatorial circuitry may separate or be disposed between the portions of the candidate block. The candidate block is pipelined within circuit design 165 with the original functionality of the candidate block from circuit design 160 being preserved or unchanged.

In another arrangement, system 100 may be coupled to a platform 175 through a communication link 170. In one example, system 100 may be coupled to platform 175 through network adapter 145. In another example, system 100 may include one or more other I/O devices such as a Universal Serial Bus (USB) interface, or other communication port that may be used to couple system 100 to platform 175.

Platform 175 may be a circuit board or card and have target hardware such as a target IC 180 coupled thereto. In one arrangement, target IC 180 may be implemented as a programmable IC such as field programmable gate array, or an ASIC. System 100 may be configured to provide or download a circuit design, e.g., a configuration bitstream specifying the circuit design, to target IC 180. In one example, the circuit design is circuit design 165. With the circuit design, e.g., circuit design 165, loaded into target IC 180, the circuit design is physically implemented within target IC 180.

Figure 2:
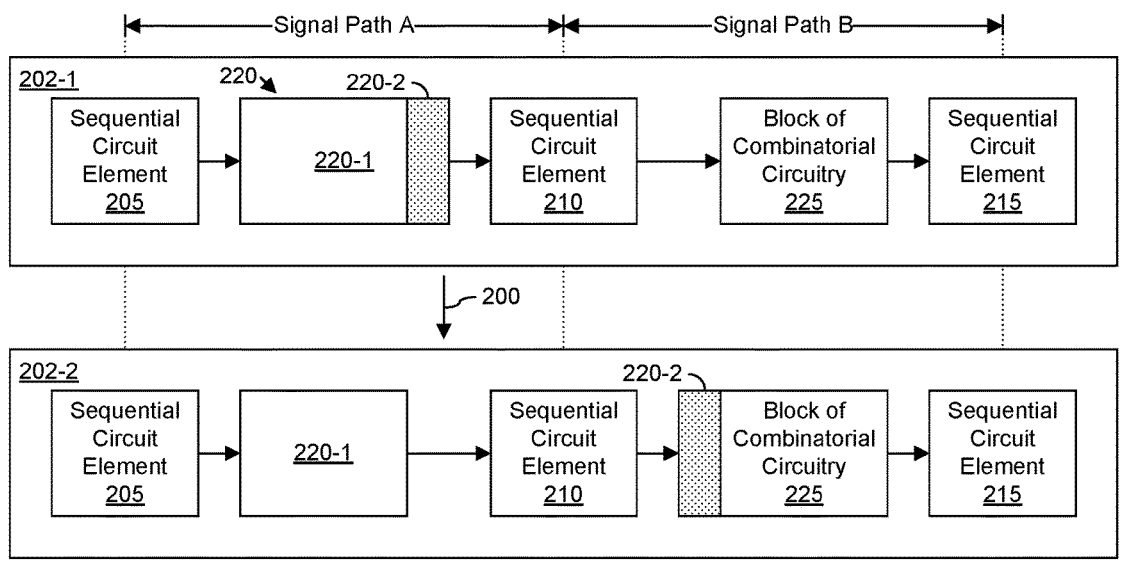
FIG. 2 illustrates an example operation for reducing dynamic power consumption of a circuit design.

FIG. 2 illustrates an example operation 200 for reducing dynamic power consumption of a circuit design. A system such as system 100 of FIG. 1 is capable of processing a circuit design and performing operation 200. The system is capable of identifying a circuit block 202 within the circuit design. The state of circuit block 202 prior to performing operation 200 is shown as circuit block 202-1. The state of circuit block 202 after performing operation 200 is shown as circuit block 202-2. In one example embodiment, a circuit block such as circuit block 202 may be a module within the circuit design or netlist as the case may be. In another example embodiment, circuit block 202 is a portion of a circuit design that includes combinatorial logic causing switching activity, e.g., at least a minimum amount of switching activity, and one or more sequential circuit elements as pipeline stages.

In another example embodiment, the system operates on the circuit design during the synthesis phase of a design flow. For example, the system receives a user-specified circuit design. As part of performing synthesis, the system is capable of converting the received circuit design into a technology independent circuit design. In one aspect, the technology independent circuit design is a technology independent netlist.

The system is capable of determining, or estimating, that circuit block 202 consumes at least a minimum amount of dynamic power. Circuit block 202 includes sequential circuit elements 205, 210, and 215. Circuit block 202 further includes a block of combinatorial circuitry 220 (block 220) and a block of combinatorial circuitry 225 (block 225). In one example embodiment, the system determines that block 220 exhibits or is characterized by high switching activity. For example, the system determines that the switching activity of block 220 exceeds a minimum or threshold amount of switching activity and is a candidate block.

For purposes of discussion, the signal path between sequential circuit element 205 and sequential circuit element 210 (signal path A) has a slack of +1 nanoseconds. The signal path between sequential circuit element 210 and sequential circuit element 215 (signal path B) has a slack of +1 nanoseconds. As defined within this disclosure, the term "slack" is the difference between a required arrival time of a signal at a circuit element, e.g., a signal arriving at a load of a net from the source, and an estimated arrival time of the signal at the circuit element. A positive slack "s" indicates that the signal path meets the timing requirement, or timing constraint, for the signal path. In that case, the delay of the signal path may be increased by "s" without increasing the overall delay of the circuit design. A negative slack "s" indicates that the signal path does not meet the timing requirement for the signal path. The signal path is slower than the requirement for the signal path. The estimated arrival time of a signal to the load of the signal path is after the required arrival time (e.g., the requirement).

As defined herein, the term "signal path" or "path," in the context of a circuit and/or circuit design, refers to a connection, e.g., wires configured to physically convey signals, between at least two endpoints. Each endpoint of the signal path is a synchronous, or clocked, circuit element. One or more combinatorial, or un-clocked, circuit elements may be in the signal path. A signal path may be formed by a connection between a source and one or more loads of the source of a net. In one example embodiment, sequential circuit elements are synchronous circuit elements.

The system is capable of determining that circuit block 202 includes one or more signal paths having a delay, e.g., a slack, that meets one or more target signal path requirements. In the example of FIG. 2, as noted, the system determines that block 220 of signal path A has an amount of switching activity that exceeds a threshold amount of switching activity. The system also determines that at least one other signal path, e.g., signal path B, coupled to signal path A meets the target signal path requirement(s). In one example embodiment, one of the target signal path requirements is for connectivity and requires that the signal path be adjacent, or abut, the signal path that includes the candidate block. In other words, signal path B is separated from signal path A by only sequential circuit elements. As shown, signal path B is separated from signal path A only by sequential circuit element 210.

As part of operation 200, the system is capable of subdividing block 220 into two or more portions. In the example of FIG. 2, the system subdivides block 220 into portion 220-1 and portion 220-2. As illustrated, as part of operation 200, the system relocates portion 220-2 from signal path A to signal path B, e.g., the target signal path. Signal path B includes block 225. So as not to change the functionality of the circuit design, portion 220-2 is located before block 225. As a result of the relocation of portion 220-2, portion 220-1 and portion 220-2 are separated only by one (or more) sequential circuit elements. In this particular example, portion 220-1 and portion 220-2 are separated by sequential circuit element 210.

In one example embodiment, the subdividing of block 220 into portions is performed based upon delay and, more particularly, slacks. For example, the system is capable of subdividing block 220 into portions 220-1 and 220-2 so that the delay of portion 220-2 does not exceed the available slack of the particular signal path to which portion 220-2 is to be moved. In this example, the system is capable of dividing block 220 so that portion 220-2 has a delay of 1 nanosecond or a delay not exceeding 1 nanosecond. In that case, subsequent to the relocation of portion 220-2 from signal path A to signal path B, the slack of signal path A becomes +2 and the slack of signal path B becomes 0. As can be seen, operation 200 does not disturb the timing of the circuit design in that operation 200 does not cause any violations of timing requirements and/or constraints.

Further, the ordering of the portions is preserved. Portion 220-1 occurs prior to portion 220-2 after operation 200 as was the case prior to operation 200. Preserving the order of the portions resulting from subdividing a candidate block allows the system to preserve the functionality of the circuit design. That is, block 202-2 is functionally equivalent to block 202-1. Portion 220-1 is separated from portion 220-2 by only sequential circuit elements (e.g., no combinatorial circuit elements separate portion 220-1 from portion 220-2).

Operation 200 results in reduced dynamic power consumption for the circuit design. The switching activity attributable to portion 220-1 occurs during one (e.g., a first) clock cycle. The switching activity attributable to portion 220-2 occurs during the next (e.g., a second) clock cycle, thereby reducing the amount of switching activity that occurs during the first clock cycle and reducing the dynamic power consumption of block 202.

In another example embodiment, the amount of switching activity attributable to portion 220-2, when combined with the switching activity of block 225, is still below the threshold for determining whether a block has high switching activity. In another example embodiment, the system is capable of determining the available slacks of signal paths that are target signal paths, determining the amount of combinatorial circuitry to move based on the slacks, and also based upon not exceeding the threshold for determining that a block has high switching activity.

Figure 3:
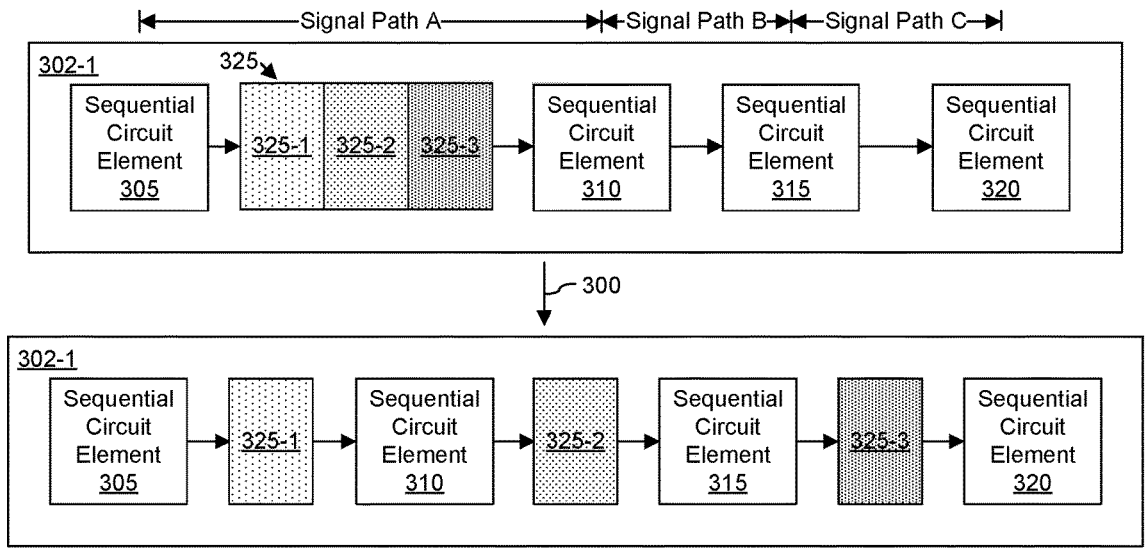
FIG. 3 illustrates another example operation for reducing dynamic power consumption of a circuit design.

FIG. 3 illustrates another example operation 300 for reducing dynamic power consumption of a circuit design. A system such as system 100 of FIG. 1 is capable of processing a circuit design and performing operation 300. The system is capable of identifying a circuit block (e.g., module) 302 within the circuit design. The state of circuit block 302 prior to performing operation 300 is shown as circuit block 302-1. The state of circuit block 302 after performing operation 300 is shown as circuit block 302-2.

In one example embodiment, the system operates on the circuit design during the synthesis phase of a design flow. For example, the system is capable of operating on the circuit design as a netlist as previously described. The system determines that circuit block 302 consumes at least a minimum amount of dynamic power. Circuit block 302 includes sequential circuit elements 305, 310, 315, and 320. Circuit block 302 further includes a block of combinatorial circuitry 325 (block 325). In one example embodiment, the system determines that block 325 exhibits or is characterized by high switching activity. For example, the system determines that the switching activity of block 325 exceeds a minimum or threshold amount of switching activity. As such, the system determines that block 325 is a candidate block.

For purposes of discussion, the signal path between sequential circuit element 305 and sequential circuit element 310 is referred to as signal path A. The signal path between sequential circuit element 310 and sequential circuit element 315 is referred to as signal path B. The signal path between sequential circuit element 315 and sequential circuit element 320 is referred to as signal path C.

As part of operation 300, the system is capable of determining that circuit block 302 includes one or more signal paths having a delay, e.g., a slack, that meets a signal path requirement. In the example of FIG. 3, the system determines that signal paths B and C include sufficient slack to receive portions of block 325. In addition, the system determines that signal paths B and C both are coupled to signal path A (the signal path with an amount of switching activity that exceeds the threshold amount of switching activity) and are separated only by sequential circuit elements.

As part of operation 300, the system is capable of subdividing block 325 into one or more portions. In the example of FIG. 3, the system subdivides block 325 into portion 325-1, 325-2, and 325-3. As illustrated, as part of operation 300, the system relocates portions 325-2 and 325-3 from signal path A to signal path B and to signal path C, respectively. In block 302-2, signal path B includes block 325-2 and signal path C includes block 325-3. As a result of the relocation of portions 325-2 and 325-3, portions 325-1, 325-2, and 325-3 are separated only by one (or more) sequential circuit elements. No other circuit elements such as combinatorial circuit elements are disposed between portions 325-1, 325-2, and/or 325-3 in block 302-1. In this particular example, portion 325-1 is separated from portion 325-2 only by sequential circuit element 310. Portion 325-2 is separated from portion 325-3 only by sequential circuit element 315.

As discussed, the subdividing of block 325 may be performed based upon delay and, more particularly, slacks. In another example embodiment, the system is also capable of subdividing block 325 based upon the number of target signal paths into which portions may be moved. In the example of FIG. 3, there are two target signal paths that may receive a portion of block 325. Accordingly, the system is capable of determining that block 325 is to be subdivided into three portions. The size of each portion may be determined so that the slack of each of paths A, B, and C is not less than 0 (e.g., does not violate timing).

In another example embodiment, signal path C may include combinatorial circuitry. In that case, portion 325-3 may be inserted after (e.g., to the right of) sequential circuit element 325 and prior to (e.g., to the left of) the combinatorial circuitry of signal path C in similar manner to the relocation of portion 220-2 in FIG. 2.

As was the case in FIG. 2, the system is capable of performing operation 300 so that the ordering of the portions is preserved. Portion 325-1 occurs prior to portion 325-2, which occurs prior to portion 325-3 after operation 300 as was the case prior to operation 300. Preserving the order of the portions resulting from subdividing a candidate block allows the system to preserve the functionality of the circuit design. That is, block 302-2 is functionally equivalent to block 302-1.

In this example, the amount of switching activity attributable to any of portions 325-1, 325-2, and/or 325-3 (including any other combinatorial circuitry to which such portion may abut as in the case of FIG. 2) is below the threshold for determining that a block has high switching activity. Thus, operation 300 results in reduced dynamic power consumption for the circuit design. The switching activity attributable to portion 325-1 occurs during one clock cycle. The switching activity attributable to portion 325-2 occurs during a next clock cycle. The switching activity attributable to portion 325-3 occurs during yet a next clock cycle, thereby reducing the amount of switching activity that occurs during a same clock signal and reducing the dynamic power consumption of block 302.

In another example embodiment, the system is capable of determining the number of target signal paths, available slacks of the target signal paths, the amount of combinatorial circuitry of the candidate block to move based on the number of target signal paths and slacks, subdivide the candidate block based upon the noted factors, and relocate the resulting portions.

FIGS. 2 and 3 illustrate example embodiments where the signal paths to which portions of a block of combinatorial circuitry with high switching activity are moved are within the same module of a hierarchical circuit design. For example, each of blocks 202 and 302 may represent a module of the netlist that may be located within a hierarchy of modules. In each of FIGS. 2 and 3, the portions are relocated within the same module. In another example embodiment, a target signal path may be located outside of, or extend outside of, the module that includes the candidate block.

Figure 4:
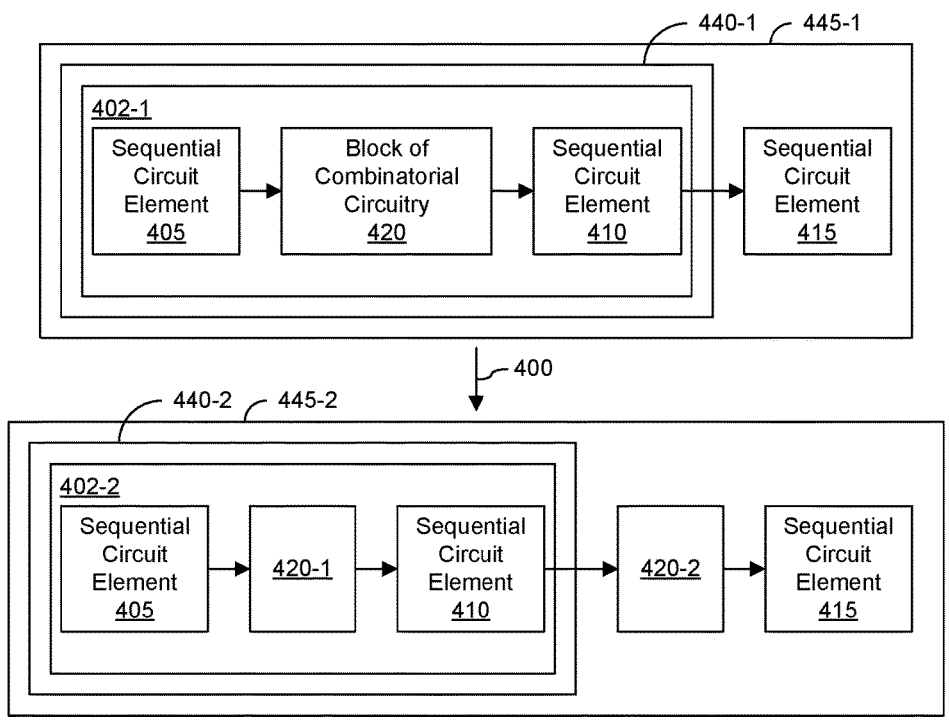
FIG. 4 illustrates an example where a module is included within another module.

FIG. 4 illustrates an example where a module 402 is included within a module 440. Module 440 is a parent to module to module 402. Module 440 is above module 402 in the hierarchy of the circuit design and/or netlist. Module 440 is included in a top level module 445. Module 445 is a parent to module to module 440. Module 445 is above module 440 in the hierarchy of the circuit design and/or netlist. Module 402 includes sequential circuit elements 405 and 410, which form a signal path A. Signal path A includes a block of combinatorial circuitry 420 (block 420). Sequential circuit element 415 is connected to sequential circuit element 410, forming signal path B. Sequential circuit element 415, however, is within top level module 445. In the example of FIG. 4, the system determines that block 420 is a candidate block.

In accordance with one or more example embodiments, the system is capable of analyzing signal path B and determining that signal path B is a target signal path despite sequential circuit element 415 being within module 445 and not within module 402 or module 440. As shown, operation 400 subdivides block 420 into portions 420-1 and 420-2. As part of operation 400, the system moves portion 420-2 from signal path A to signal path B resulting in the structure shown corresponding to modules 402-2, 440-2, and 445-2.

In one embodiment, the system may be configured, through a preference setting, as to whether to search for target signal paths that are external to the particular module that includes the candidate block. For example, one setting may cause the system to not search for target signal paths that extend outside of the module including the candidate block. Another setting may cause the system to include such paths in the analysis and/or search for target paths that are outside or extend outside of the module that includes the candidate block.

It should be appreciated that while FIG. 4 illustrates the case where a portion of block 420 is moved to the right, in another example embodiment, a portion of block 420, e.g., portion 420-1, may be moved to the left. For example, portion 420-1 may be moved to a target signal path to the left of sequential circuit element 405 that extends outside of module 402.

Figure 5:
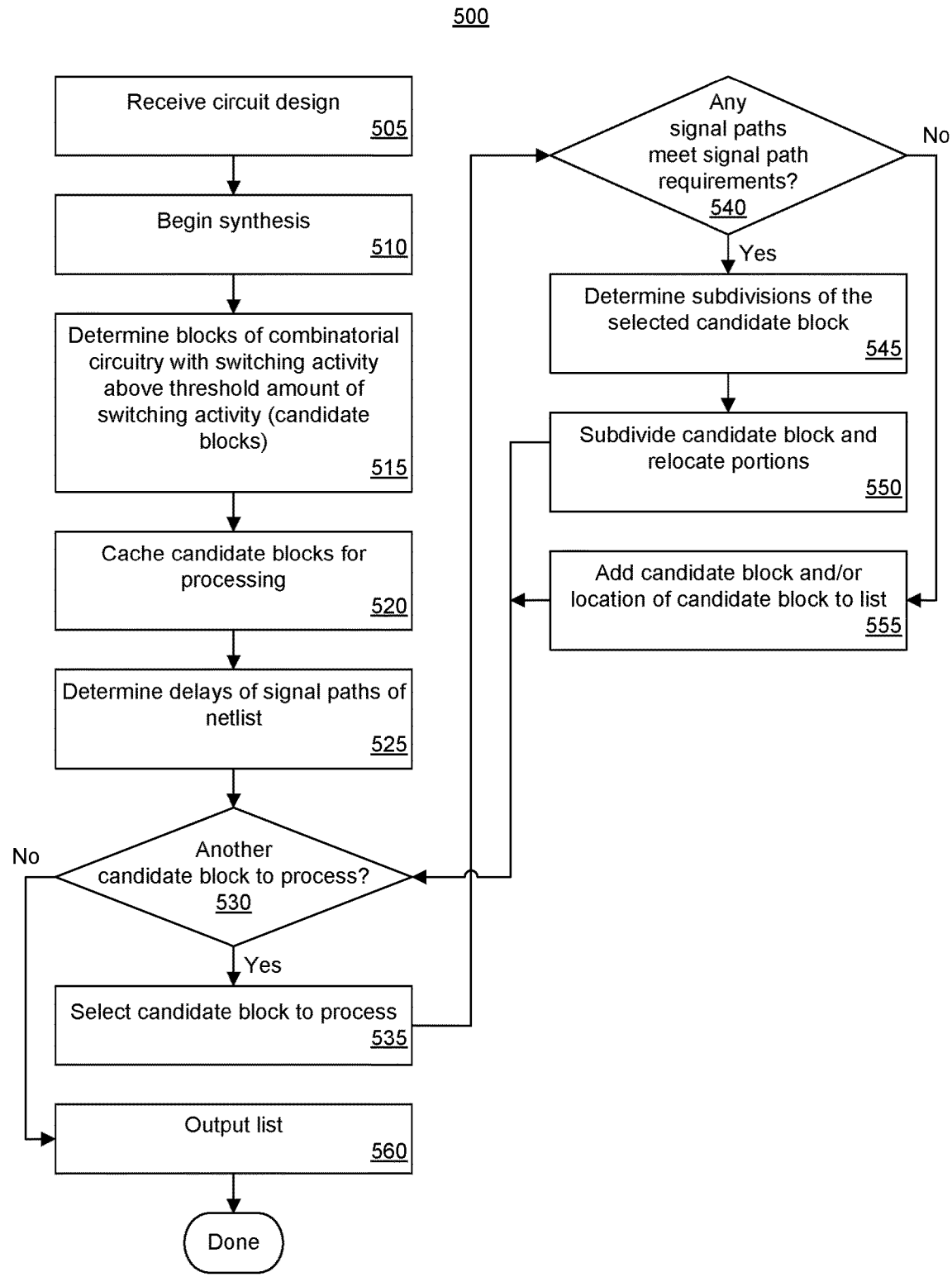
FIG. 5 illustrates a method of reducing dynamic power consumption within a circuit design.

FIG. 5 illustrates a method 500 of reducing dynamic power consumption within a circuit design. Method 500 may be performed by a system as described generally in connection with FIG. 1.

In block 505, the system receives a circuit design. The circuit design may be a user specified circuit design. The circuit design is specified programmatically, e.g., as a data structure within memory. In one aspect, the circuit design is specified using a hardware description language. The circuit design may be specified in another format. The system is capable of loading the circuit design in memory for processing.

In block 510, the system begins synthesis on the circuit design. In one example embodiment, the system, as part of performing synthesis, translates the circuit design into a technology independent format. The system, for example, is capable of generating a technology independent netlist from the received circuit design.

A netlist, or "network list," may be implemented as a programmatic (e.g., a data structure) list of terminals or pins of the electronic circuit components in the circuit design and a list of conductors (nets) that interconnect the terminals. In one aspect, the netlist may include technology independent circuit components such as various logic gates, flip-flops, and so forth. For example, the netlist is not specified using circuit structures that are specific or unique to particular brands, models, and/or manufacturers of ICs. Rather, the netlist is specified using AND gates, OR gates, XOR gates, and so forth.

In block 515, the system determines, or detects, blocks of combinatorial circuitry with switching activity above a threshold amount of switching activity. The system is capable of analyzing the netlist and determining and/or estimating the switching activity of the blocks of combinatorial circuitry included therein. The system is capable of determining the switching activity of the blocks of combinatorial circuitry and comparing the switching activity to a threshold amount of switching activity. As discussed, those blocks of combinatorial circuitry that have a switching activity exceeding a threshold switching activity are considered candidate blocks.

In one example embodiment, the system determines the switching activity of the blocks of combinatorial circuitry using a cost function. In one aspect, the switching activity of a block of combinatorial circuitry is an estimate of the switching activity that will occur within the circuitry specified by the block once implemented within an IC. The cost function may depend upon one or more parameters including, but not limited to, the number of logic gates within the block of combinatorial circuitry, the type of gates in the block of combinatorial circuitry, the width of the combinatorial circuitry (e.g., the signal path width), the number of levels of the combinatorial circuitry, and so forth. The cost function may also depend upon a combination of one or more or all of the aforementioned parameters.

In one example embodiment, the system calculates a cost function for blocks of combinatorial circuitry of the circuit design based upon the total number of logic gates in the block. The total number of logic gates may be the value of the cost function. In another example embodiment, the cost function may be calculated based upon the number of a particular type of logic gate in the block. For example, the cost function may be the number of XOR gates in the block. In still another example embodiment, the cost function may be the number of each different type of logic gate found in the block multiplied by a weighting factor specific to the type of logic gate and summed.

As an illustrative example, an XOR gate is sensitive to both a 0 signal and a 1 signal on both inputs. By comparison, when one input of an AND gate is 0, the other input may be ignored. As such, the output of the XOR gate has a higher likelihood of transitioning (e.g., switching states) than an AND gate. Combinatorial circuitry that includes XOR gates will likely exhibit higher switching activity than combinatorial circuitry not including XOR gates or including fewer XOR gates. Referring to the prior example(s), the number of XOR gates in a block may be weighted with a larger factor than the number of AND or other gates when calculating the cost function.

In a further example, the cost function may include factors that may be determined based upon a width of the block of combinatorial circuitry, the number of levels of the block of combinatorial circuitry, and so forth. Larger widths, for example, may be incorporated into the cost function as factors that increase with increasing width and/or by adding a value that is increased with increasing width. Similarly, the greater the number of levels in the block, the larger the factor and/or added value used in the cost function for the block.

In another example embodiment, the system is capable of determining the type of a circuit block and/or module. Within the user circuit design, the user may designate, label, or tag particular circuit blocks and/or modules. Examples of labels, types, and/or tags include error correction (e.g., forward error correction), error detection, encryption, decryption, parity checking, etc. The system is capable of searching the netlist for the labels, tags, or other identifiers of the type of circuit block and/or module. Often, the types of circuit blocks and/or modules described herein include a significant number of XOR gates. As such, the system is capable of locating the enumerated types of circuit blocks and/or modules and considering such circuit blocks and/or modules to have switching activity that exceeds the threshold level of switching activity. Accordingly, the system may detect enumerated blocks and designate such enumerated blocks as candidate blocks.

In block 520, the system caches those blocks of combinatorial circuitry of the netlist having switching activity exceeding the threshold switching activity as determined in block 515, e.g., the candidate blocks. In another example embodiment, the system caches the modules of the netlist that include the candidate blocks. Similarly, responsive to determining that a block of combinatorial circuitry is part of an enumerated circuit block and/or module, the system is capable of caching that block of combinatorial circuitry and/or the module containing the block of combinatorial circuitry as a candidate block for further processing.

In block 525, the system determines delays for signal paths of the netlist. In one example embodiment, the system determines delays for signal paths as part of the continued synthesis process. As part of determining the delays, the system is further capable of determining the slacks for the signal paths of the circuit design.

In block 530, the system begins processing the candidate blocks. The system determines whether any cached candidate blocks (in reference to the candidate blocks themselves and/or the modules including the candidate blocks) remain to be processed. If so, method 500 continues to block 535. If not, method 500 proceeds to block 560. In block 560, the system outputs a list. The list that is output is described in greater detail with reference to block 555. After block 560, method 500 may end.

In block 535, the system selects a candidate block that has not yet been processed. In block 540, the system determines whether any signal paths meet the target signal path requirement(s) in order to continue processing the candidate block. If so, method 500 continues to block 545. If not, method 500 proceeds to block 555.

In one example embodiment, the preference of whether a target signal path must be within a same module as the candidate block may be expressed or applied as a target signal path requirement if selected. In another example embodiment, a target signal path requirement is that a signal path must be coupled to the signal path including the candidate block. In addition, the target signal path must be coupled to the signal path including the candidate block by no more than sequential circuit elements. Referring to FIG. 2, for example, signal path B is a target signal path whether or not signal path B includes combinatorial circuitry. A further signal path, e.g., a next signal path adjacent or abutting signal path B to the right that is driven by sequential circuit element 215, however, is not a target signal path since that signal path is coupled to signal path A through block 225.

Another target signal path requirement may be that the signal path must include sufficient slack, e.g., positive slack, to receive at least a portion of relocated combinatorial circuitry from the candidate block. A path with sufficient latency, e.g., slack, has enough pipeline stages to distribute the candidate block between the pipeline stages. Switching activity may be "shielded" since the sequential circuit element, e.g., a flip-flop, acts as a barrier. A path with tight latency (e.g., insufficient slack to receive a portion of the candidate block) or failed latency (negative slack) means that there are insufficient pipeline stages to automatically distribute portions of the candidate block.

While the examples disclosed herein illustrate movement of portions of the candidate block to signal paths to the right, similar operations may be performed where portions are moved to the left (e.g., toward an input as opposed to an output) or both to the left and to the right. In any case, the target signal path requirements still must be observed with the ordering of the portions of the candidate block maintained. In moving a portion to the left, for example, the portion would be the left portion of the candidate block as opposed to a portion located on the right of the candidate block so as to preserve the original order of portions and functionality of the candidate block.

In the event that one or more of the signal path requirements is not met and the system determines that no target signal paths exist, method 500 continues to block 555. In block 555, the system optionally adds the candidate block and/or the location of the candidate block within the netlist to a list of candidate blocks that were not processed for dynamic power reduction. In one example embodiment, the system only adds the candidate block to the list when a signal path exists that meets each target signal path requirement except for the slack target signal path requirement. In such cases, the addition of the candidate block to the list indicates to a designer that manually adding one or more pipeline stages at or near the candidate block, e.g., to the signal path that did not meet the target signal path requirement for slack, may allow the system to process the candidate block in a further or subsequent application of the operations described herein to further reduce dynamic power consumption of the circuit design.

After block 555, method 500 loops back to block 530 to determine whether there are any other candidate blocks that remain to be processed. If one or more signal paths do meet the target signal path requirement(s), method 500 continues to block 545.

Continuing with block 545, in the case where the system determines one or more target signal paths for the candidate block, the system determines the subdivisions of the candidate block. In one example embodiment, the system determines the number of portions to create based upon subdivision criteria. One example of a subdivision criterion is the number of target signal paths found in block 540. For example, if one target signal path is found, the system is capable of subdividing the candidate block one time resulting in two portions. If two target signal paths are found, the system is capable of subdividing the candidate block two times resulting in three portions.

Another example of a subdivision criterion may limit the number of portions of the candidate block that are created. For example, despite the availability of a plurality of target signal paths for the candidate block, the system may not need to create a portion for each target signal path in order to meet a dynamic power consumption goal. In one example embodiment, the system may determine the switching activity that is attributable to different portions of the candidate block. The system is capable of continuing to subdivide the candidate block into additional portions as long as sufficient target signal paths are available at least until each resulting portion has a switching activity that falls below a switching activity threshold (e.g., which may be used as a subdivision criterion).

As an illustrative example, the system is capable of determining the number of target signal paths available, determining the slack of each target signal path, determine an amount of combinatorial circuitry that may be included in each target signal path without violating timing constraints, and determine the switching activity attributable to each resulting portion of the candidate block. The system may create fewer or more portions based upon the availability of target signal paths and whether any portion of the candidate block has a switching activity that still exceeds the threshold switching activity. For example, if a portion of the candidate block has a switching activity that exceeds the switching activity threshold and one or more additional target signal paths are available, the system may create more portions to utilize the available target signal path(s) to further lower the dynamic switching activity. The system may stop creating portions despite the availability of additional target signal paths in the case where each of the portions has a switching activity that is below the threshold switching activity.

In block 550, the system subdivides the candidate block based upon the subdivisions determined in block 545. The system further relocates portions of the candidate block. For example, if the candidate block is subdivided into 3 portions, the system is capable of relocating N−1 portions, where N is the number of portions. Accordingly, the system is capable of relocating 2 portions, while one portion remains in place. As discussed, the ordering of the portions remains unchanged and only sequential circuit elements may separate the portions of the candidate block.

At the conclusion of performing method 500, the circuit design may be processed through the remainder of a design flow for implementation within an IC. Method 500 may be performed as part of a synthesis process. In general, synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates (e.g., a netlist).

Synthesis may also include mapping. Mapping is the process of correlating, or matching, the logic gates of the low-level circuit design to the various types of physical circuit blocks that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, PIPs, PIP settings, and/or other interconnect circuitry to electrically couple the various circuit blocks of the target IC after placement.

The system may further generate a configuration bitstream from the processed circuit design. The configuration bitstream may be loaded into a programmable IC thereby physically implementing the circuitry specified by the circuit design within the IC. It should be appreciated that a circuit design may be implemented within other varieties of ICs and that the use of a programmable IC is for purposes of illustration only. The example embodiments described herein may be applied to an electronic design automation process for circuit designs for any of a variety of different types of ICs.

Figure 6:
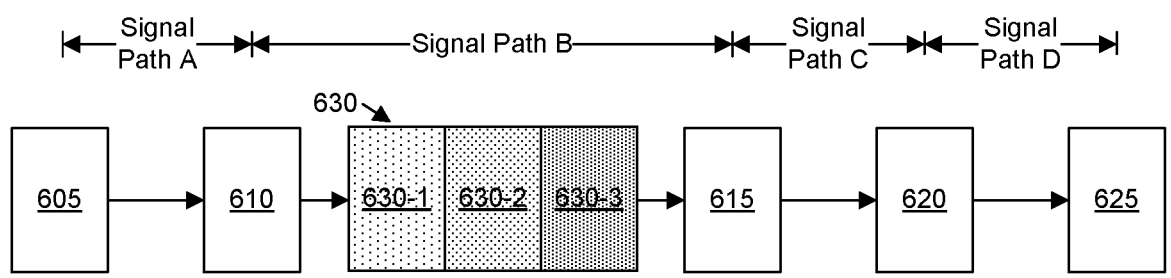
FIG. 6 illustrates further example operations for reducing dynamic power consumption of a circuit design.

FIG. 6 illustrates further example operations for reducing dynamic power consumption of a circuit design. A system such as system 100 of FIG. 1 is capable of processing a circuit design and performing the operations described in connection with FIG. 6. The system is capable of identifying block 630, which is a block of combinatorial circuitry, within the circuit design as having switching activity that exceeds the threshold amount of switching activity. Responsive thereto, the system identifies block 630 as a candidate block. Blocks 605, 610, 615, 620, and 625 are sequential circuit elements.

For purposes of explanation, the system has determined that each of signal paths A, C, and D is a target signal path and as such, may receive a portion of the combinatorial circuitry of block 630. The system further has determined that only three portions are needed to meet a switching activity goal. Example operations that may be performed include:

Moving portion 630-1 to signal path A, moving portion 630-3 to signal path C, and keeping portion 630-2 in signal path B.

Moving portion 630-2 to signal path C, moving portion 630-3 to signal path D, and keeping portion 630-1 in signal path B.

In both examples, the ordering of the portions of block 630 is preserved. In another example, if signal path C includes combinatorial circuitry, then signal path C may still receive a portion of block 630 as long as that portion is placed between sequential circuit element 615 and the combinatorial circuitry. In that case, however, signal path D is not a target signal path since signal path D is no longer connected to signal path B through only sequential circuit elements. Similarly, if signal path A includes combinatorial circuitry, any portion relocated to signal path A must be located between the combinatorial circuitry and sequential circuit element 610. Further, if a preceding signal path to the left of combinatorial circuit element 605 had been a target signal path, that signal path would no longer be a target signal path were signal path A to include combinatorial circuitry.

In moving or relocating portions of a candidate block, in one example embodiment, the system is capable of performing moves using the closest available target paths. Referring to FIG. 6, for example, the system would not relocate a portion of block 630 to signal path D before utilizing signal path C.

In one or more other embodiments, the system may determine that despite the circuit design including one or more candidate blocks, there is not a sufficient number of target signal paths to process the candidate blocks. In that case, the system is capable of outputting a message identifying path(s) that include the candidate block(s), the candidate blocks, and/or modules that include the paths and/or candidate blocks so that a circuit designer may modify the circuit design by inserting additional pipelined stages. Subsequent to the addition of the pipelined stages, the system may perform the operations described herein.

The inventive arrangements described herein may be implemented as a method or process performed by a data processing system. In another aspect, the inventive arrangements may be implemented as a data processing system having a processor. The processor, upon executing program code, generates hardware descriptions (performs operations) as described herein. In still another aspect, the inventive arrangements may be implemented as a non-transitory computer-readable storage medium storing program code that, when executed, causes a processor and/or a system to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

In one arrangement, the term "circuit design" means one or more hardware description language (HDL) modules. A circuit design may refer to an entire circuit design that includes user specified HDL; one or more cores and/or intellectual properties (IPs); a combination of user specified HDL, cores, and/or IP; a single IP and/or core (e.g., a reusable portion of HDL); or the like. In this regard, the term "module" may refer to a unit of HDL. A module, for example, is a defined construct within the syntax of the particular HDL that is being used and is part of a hierarchical organization of modules forming the circuit design. Examples of HDL include VHDL, Verilog, register transfer level (RTL) descriptions, etc. A netlist may be generated from the HDL.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "hardware description language" is a computer-language that facilitates the documentation, design, and manufacturing of a digital system, such as an integrated circuit. A hardware description language, or HDL, combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high level programming languages, an HDL also includes an explicit notion of time, which is a primary attribute of a digital system.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "real time" means a level of processing responsiveness that a user or system senses as sufficiently immediate for a particular process or determination to be made, or that enables the processor to keep up with some external process. As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of reducing dynamic power consumption for a circuit can include analyzing, using a processor, a netlist specifying the circuit to determine a block of combinatorial circuitry in a first signal path with at least a threshold amount of switching activity and detecting, using the processor, a second signal path coupled to the block of combinatorial circuitry by a sequential circuit element. The second signal path has a delay that meets a target signal path requirement. The method can include, using the processor, modifying the netlist by subdividing the block of combinatorial circuitry into at least a first portion and a second portion and moving one of the portions from the first signal path to the second signal path, wherein the moving separates the first portion from the second portion by the sequential circuit element.

In one aspect, the block of combinatorial circuitry is bounded by one or more sequential circuit elements at an input and one or more sequential circuit elements at an output.

In another aspect, the portions of the block of combinatorial circuitry have an order prior to the modifying, and subsequent to the modifying, the portions of the block of combinatorial circuitry are separated only by one or more sequential circuit elements and the order of the portions is unchanged.

In another aspect, the second signal path includes combinatorial circuitry and the selected portion of the block of combinatorial circuitry abuts the combinatorial circuitry of the second signal path.

In yet another aspect, the first signal path may meet a timing requirement.

In still another aspect, a size of the selected portion can be determined based upon a slack of the second signal path.

In a further aspect, the block of combinatorial circuitry may be subdivided into a number of portions determined based upon a number of target signal paths for the block of combinatorial circuitry.

A system for reducing dynamic power consumption of a circuit includes a processor configured to initiate executable operations. The executable operations include analyzing a netlist specifying the circuit to determine a block of combinatorial circuitry in a first signal path with at least a threshold amount of switching activity and detecting a second signal path coupled to the block of combinatorial circuitry by a sequential circuit element. The second signal path has a delay that meets a target signal path requirement. The executable operations can include modifying the netlist by subdividing the block of combinatorial circuitry into at least a first portion and a second portion and moving one of the portions from the first signal path to the second signal path, wherein the moving separates the first portion from the second portion by the sequential circuit element.

In one aspect, the block of combinatorial circuitry is bounded by one or more sequential circuit elements at an input and one or more sequential circuit elements at an output.

In another aspect, the portions of the block of combinatorial circuitry have an order prior to the modifying, and subsequent to the modifying, the portions of the block of combinatorial circuitry are separated only by one or more sequential circuit elements and the order of the portions is unchanged.

In another aspect, the second signal path includes combinatorial circuitry and the selected portion of the block of combinatorial circuitry abuts the combinatorial circuitry of the second signal path.

In yet another aspect, the first signal path meets a timing requirement.

In still another aspect, a size of the selected portion is determined based upon a slack of the second signal path.

In a further aspect, the block of combinatorial circuitry is subdivided into a number of portions determined based upon a number of target signal paths for the block of combinatorial circuitry.

A computer program product includes a computer readable storage medium having program code stored thereon. The program code is executable by a processor to perform a method of reducing dynamic power consumption for a circuit. The method includes analyzing, using the processor, a netlist specifying the circuit to determine a block of combinatorial circuitry in a first signal path with at least a threshold amount of switching activity and detecting, using the processor, a second signal path coupled to the block of combinatorial circuitry by a sequential circuit element. The second signal path has a delay that meets a target signal path requirement. The method can include, using the processor, modifying the netlist by subdividing the block of combinatorial circuitry into at least a first portion and a second portion and moving one of the portions from the first signal path to the second signal path, wherein the moving separates the first portion from the second portion by a sequential circuit element.

In one aspect, the block of combinatorial circuitry is bounded by one or more sequential circuit elements at an input and one or more sequential circuit elements at an output.

In another aspect, the portions of the block of combinatorial circuitry have an order prior to the modifying, and subsequent to the modifying, the portions of the block of combinatorial circuitry are separated only by one or more sequential circuit elements and the order of the portions is unchanged.

In another aspect, the second signal path includes combinatorial circuitry and the selected portion of the block of combinatorial circuitry abuts the combinatorial circuitry of the second signal path.

In yet another aspect, the first signal path meets a timing requirement.

In still another aspect, a size of the selected portion is determined based upon a slack of the second signal path.

In a further aspect, the block of combinatorial circuitry is subdivided into a number of portions determined based upon a number of target signal paths for the block of combinatorial circuitry.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of reducing dynamic power consumption for a circuit, the method comprising:
    analyzing, using a processor, a netlist specifying the circuit to determine switching activity of a block of combinatorial circuitry in a first signal path;
    comparing the switching activity of the block of combinatorial circuitry of the first signal path with a threshold amount of switching activity to determine whether the switching activity exceeds the threshold amount of switching activity;
    detecting, using the processor, a second signal path coupled to the block of combinatorial circuitry by a sequential circuit element, the second signal path having a delay that meets a target signal path requirement; and
    in response to determining that the switching activity exceeds the threshold amount of switching activity and the detecting the second signal path coupled to the block of combinatorial circuitry by the sequential circuit element, modifying, using the processor, the netlist by subdividing the block of combinatorial circuitry into at least a first portion and a second portion and moving one of the portions from the first signal path to the second signal path, wherein the moving separates the first portion from the second portion by the sequential circuit element;
    wherein the portions of the block of combinatorial circuitry have an order prior to the modifying, and subsequent to the modifying, the portions of the block of combinatorial circuitry are separated only by one or more sequential circuit elements and the order of the portions is unchanged.

2. The method of claim 1, wherein a configuration bitstream is generated from the modified netlist and loaded within a programmable integrated circuit to implement the modified netlist within the programmable integrated circuit.

3. The method of claim 1, wherein the second signal path comprises combinatorial circuitry and the selected portion of the block of combinatorial circuitry abuts the combinatorial circuitry of the second signal path.

4. The method of claim 1, wherein the first signal path meets a timing requirement.

5. The method of claim 1, wherein a size of the selected portion is determined based upon a slack of the second signal path.

6. The method of claim 1, wherein the block of combinatorial circuitry is subdivided into a number of portions determined based upon a number of target signal paths for the block of combinatorial circuitry.

7. The method of claim 1, wherein the modified netlist is implemented within an integrated circuit.

8. A system for reducing dynamic power consumption of a circuit, comprising:
    a processor configured to initiate executable operations including:
    analyzing a netlist specifying the circuit to determine switching activity of a block of combinatorial circuitry in a first signal path;
    comparing the switching activity of the block of combinatorial circuitry of the first signal path with a threshold amount of switching activity to determine whether the switching activity exceeds the threshold amount of switching activity;
    detecting a second signal path coupled to the block of combinatorial circuitry by a sequential circuit element, the second signal path having a delay that meets a target signal path requirement; and
    in response to determining that the switching activity exceeds the threshold amount of switching activity and the detecting the second signal path coupled to the block of combinatorial circuitry by the sequential circuit element, modifying the netlist by subdividing the block of combinatorial circuitry into at least a first portion and a second portion and moving one of the portions from the first signal path to the second signal path, wherein the moving separates the first portion from the second portion by the sequential circuit element;
    wherein the portions of the block of combinatorial circuitry have an order prior to the modifying, and subsequent to the modifying, the portions of the block of combinatorial circuitry are separated only by one or more sequential circuit elements and the order of the portions is unchanged.

9. The system of claim 8, wherein a configuration bitstream is generated from the modified netlist and implemented within a programmable integrated circuit to implement the modified netlist within the programmable integrated circuit.

10. The system of claim 8, wherein the second signal path comprises combinatorial circuitry and the selected portion of the block of combinatorial circuitry abuts the combinatorial circuitry of the second signal path.

11. The system of claim 8, wherein the first signal path meets a timing requirement.

12. The system of claim 8, wherein a size of the selected portion is determined based upon a slack of the second signal path.

13. The system of claim 8, wherein the block of combinatorial circuitry is subdivided into a number of portions determined based upon a number of target signal paths for the block of combinatorial circuitry.

14. The system of claim 8, wherein the modified netlist is implemented within an integrated circuit.

15. A computer program product comprising a computer readable storage medium having program code stored thereon, the program code executable by a processor to perform a method of reducing dynamic power consumption for a circuit, the method comprising:
- analyzing, using the processor, a netlist specifying the circuit to determine switching activity of a block of combinatorial circuitry in a first signal path;
- comparing the switching activity of the block of combinatorial circuitry of the first signal path with a threshold amount of switching activity to determine whether the switching activity exceeds the threshold amount of switching activity;
- detecting, using the processor, a second signal path coupled to the block of combinatorial circuitry by a sequential circuit element, the second signal path having a delay that meets a target signal path requirement; and
- in response to determining that the switching activity exceeds the threshold amount of switching activity and the detecting the second signal path coupled to the block of combinatorial circuitry by the sequential circuit element, modifying, using the processor, the netlist by subdividing the block of combinatorial circuitry into at least a first portion and a second portion and moving one of the portions from the first signal path to the second signal path, wherein the moving separates the first portion from the second portion by the sequential circuit element;
- wherein the portions of the block of combinatorial circuitry have an order prior to the modifying, and subsequent to the modifying, the portions of the block of combinatorial circuitry are separated only by one or more sequential circuit elements and the order of the portions is unchanged.

16. The computer program product of claim 15, wherein a configuration bitstream is generated from the modified netlist and implemented within a programmable integrated circuit to implement the modified netlist within the programmable integrated circuit.

17. The computer program product of claim 15, wherein the second signal path comprises combinatorial circuitry and the selected portion of the block of combinatorial circuitry abuts the combinatorial circuitry of the second signal path.

18. The computer program product of claim 15, wherein a size of the selected portion is determined based upon a slack of the second signal path.

19. The computer program product of claim 15, wherein the block of combinatorial circuitry is subdivided into a number of portions determined based upon a number of target signal paths for the block of combinatorial circuitry.

20. The computer program product of claim 15, wherein the modified netlist is implemented within an integrated circuit.

* * * * *